United States Patent

[11] 3,581,955

| [72] | Inventors | Teruhiro Kawata<br>I 27-2-cho, Kasumigaoka, Sakai;<br>Yojiro Arata, 27-4, C-chomi, Nakaburi, Minami, Hirokota; Katumi Tokoyama, 513, Naka-2-cho, Ishizu-cho, Hamadera, Sakai, Osaka Prefecture, all of, Japan |
|---|---|---|
| [21] | Appl. No. | 789,689 |
| [22] | Filed | Jan. 8, 1969 |
| [45] | Patented | June 1, 1971 |

[54] MEANS FOR SUPPLYING PULVERIZED PLASTIC ELEMENTS
5 Claims, 6 Drawing Figs.

| [52] | U.S. Cl. | 222/373, 177/114 |
|---|---|---|
| [51] | Int. Cl. | B67d 5/40 |
| [50] | Field of Search | 177/114, 66; 222/373, 193, 56, 58; 141/83; 302/3 |

[56] References Cited
UNITED STATES PATENTS

| 3,195,662 | 7/1965 | Joiner et al. | 177/114X |
| 3,202,230 | 8/1965 | Brichard | 177/114X |
| 3,399,808 | 9/1968 | Bucy | 222/373X |

*Primary Examiner*—Stanley H. Tollberg
*Attorney*—Moonray Kojima

ABSTRACT: Apparatus for dispensing accurately measured pulverized material from a storage bin to another location, comprising a weighing hopper attached to a weighing scale, a vacuum pump, and a feed pipe capable of picking up the pulverized material under the suction force provided by the vacuum pump and feeding the material to the hopper until a predetermined amount is determined by the scale, whereupon either manually or automatically, the feeding is stopped and a door is opened at the bottom of the hopper by force of gravity acting upon the stored matter to release the material after which the door closes and the sequence is repeated.

INVENTORS
TERUHIRO KAWATA
YOJIRO ARATA
KATUMI TOKOYAMA

BY Moonray Kojima
ATTORNEY

MEANS FOR SUPPLYING PULVERIZED PLASTIC ELEMENTS

This invention relates to the system for supplying the pulverized plastic elements of synthetic resin materials or the like from a storing tank into a desired means like a mixing machine or a plastic former.

Generally speaking, these elements are delivered by a pneumatic delivery means. However, during the process in which the pneumatic delivery is made to supply these elements ultimately to the desired means, these have to be fed into the hopper of the balance means by such a feeding means for example as an electromagnetic feeder, a rotary feeder or varied types of conveyors. Namely, according to the conventional method it is necessary to apply to both the pneumatic delivery means and the balance means in order to convey the pulverized plastic elements from the storing tank and balance the same to a fixed quantity.

Thus referring to the supplying process only, these pulverized plastic elements in the storing tank are firstly delivered to the balance means, by which secondly the delivered elements are balanced to a fixed quantity and lastly the balanced quantity of the elements is delivered into the desired means.

However, when the aforementioned method is adopted, the balance means has to be provided additionally to the pneumatic delivery means. Therefore it has disadvantages in that the cost of equipment is increased and the installation of the balance means requires extra labor and a more extensively spatial room.

The present invention has been made in order to eliminate these defects and disadvantages, having as one of its principal objectives a provision of such a single supplying means that can pneumatically deliver the pulverized plastic elements to the balance means for balancing to a fixed quantity and further deliver the thus balanced quantity of the elements into the desired means.

Another objective of the invention is to provide the supplying system which can automatically control the operation of pneumatically delivering the elements and at the same time balancing the delivered elements to a determined quantity. Further another objective of the invention is to provide the supplying system that can pneumatically deliver the pulverized plastic elements very efficiently in a short time and also balance the delivered elements to a determined quantity with extreme accuracy.

The present invention is featured with the balance means whereupon the cyclone separation tank of the pneumatic delivery means is mounted in such a manner as to serve for a balance hopper whereby the pulverized plastic elements can be pneumatically delivered and balanced to a determined quantity merely by applying to a single supplying means.

The detailed explanation of the present invention is as disclosed in the succeeding specification set forth with reference to the accompanying drawings and the novel features of the invention are as claimed in what is claimed.

Now referring to each figure of the drawings showing some of the embodiments executed in accordance with the invention in which.

Figure 1:
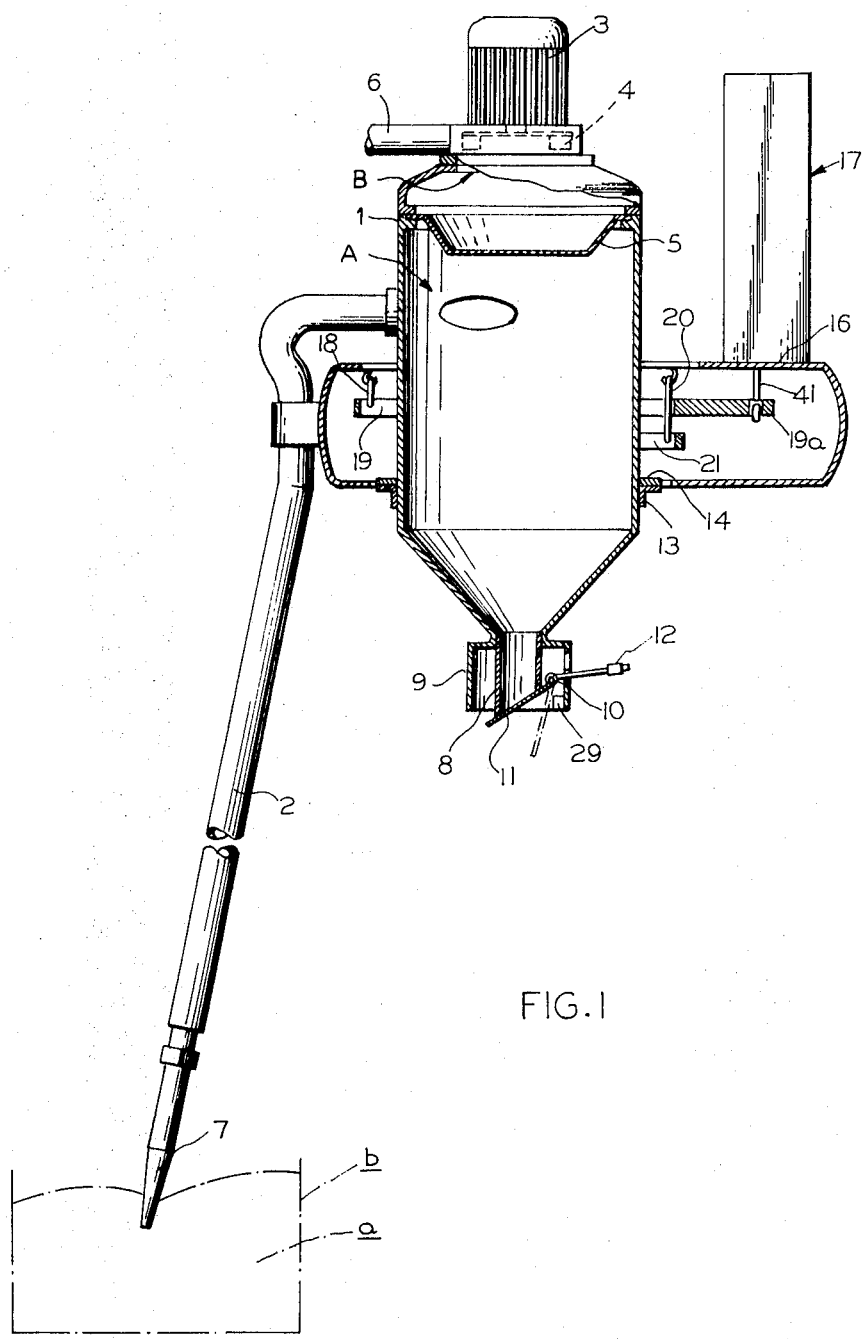
FIG. 1 is a frontal view partially showing one of the embodiments of the invention.
Figure 2:
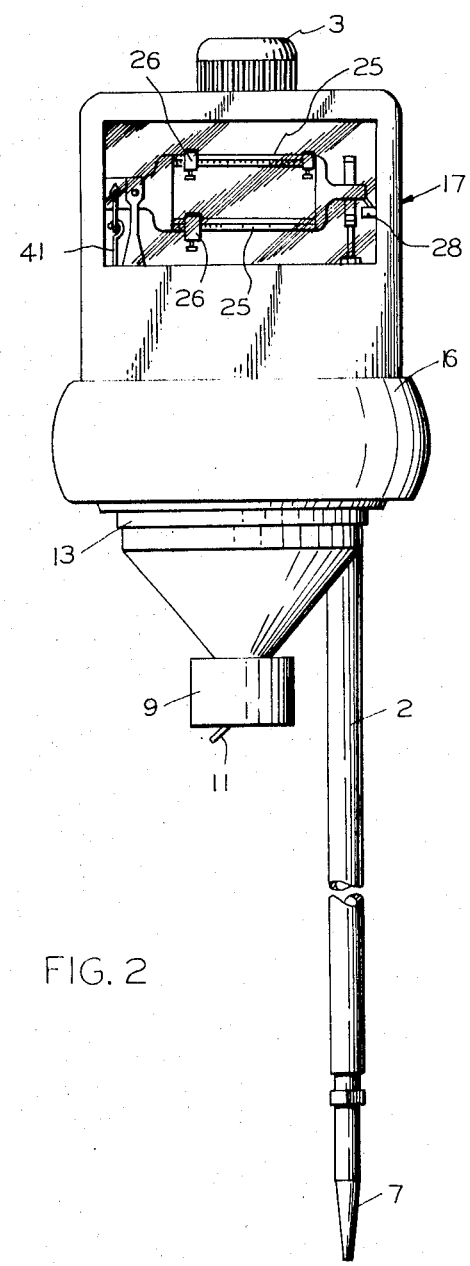
FIG. 2 is a side section view thereof.
Figure 3:
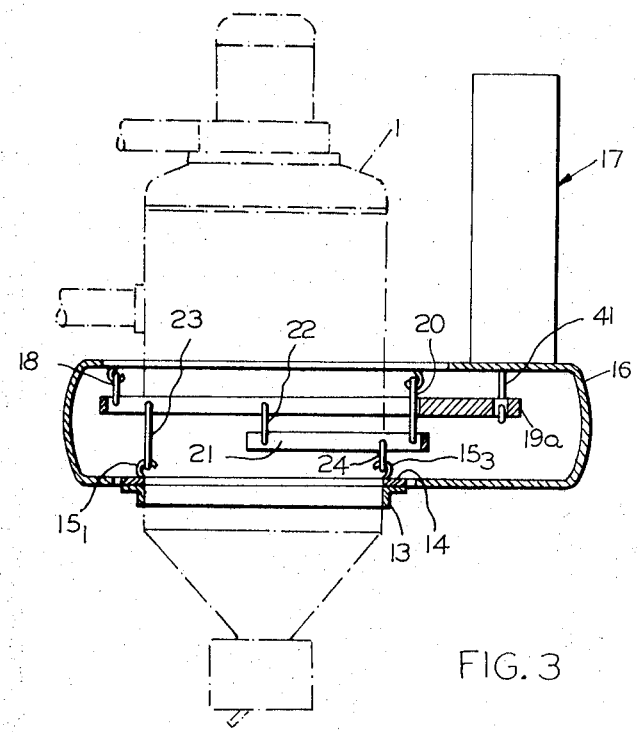
FIG. 3 is a frontal view thereof longitudinally cut and partially taken in section.
Figure 4:
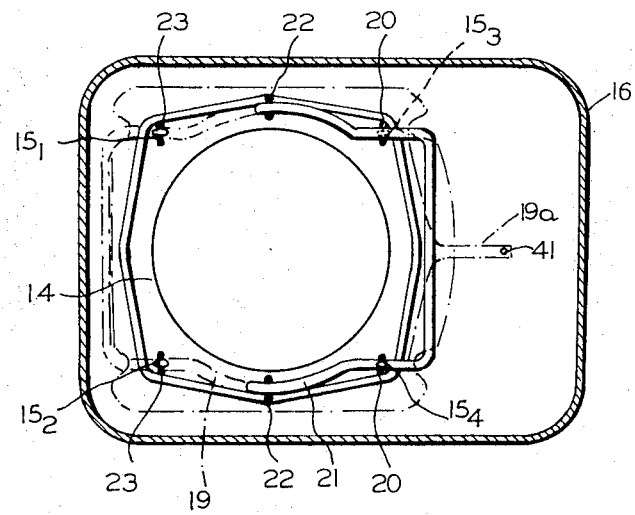
FIG. 4 is a cross section view thereof.

Accounting for the supplying system of the invention especially with reference to the FIGS. 1 thru 4 exemplified in the accompanying drawings, reference numeral I shown in these figures designates a main body whose lower cylindrical portion is funnel shaped, and at the direction of the dotted line of the upper portion thereof there are mounted a delivery pipe 2, a fan motor 3, the fan 4 driven by said fan motor 3, a filter 5 and an exhaustion pipe 6. Said delivery pipe 2 is at its foremost end provided with a suction nozzle 7 inserted into the pulverized plastic elements a stored in a repository b or the like, and said elements a are sucked into the main body I under the influence of the absorption force thereof, through said suction nozzle 7. Said filter 5 is composed of the cloth woven with Tetoron yarn or similar quality yarn, and divides the main body I into a separation room or chamber A and a suction room or chamber B. In the box 9 formed in the lower opening of the main body I there is provided an element chute 8 in communicated relation with said opening.

In the free end of this chute 8 is provided a damper 11 which rotates through a shaft 10, and on said damper 11 is provided a balance weight 12 which contacts the damper 11 with the free end of the chute 8 and closes the same. An annular supporting frame 13 fixed on the outer peripheral surface of the main body I has its upper surface provided fixedly with a plate body 14 of horizontally a little square shape and having a round hole in the middle portion thereof, as is definitely shown in the FIG. 4. The four corners of this plate body 14 are hooked respectively with four uncinate hangers 15-1, 15-2, 15-3 and 15-4.

Numeral 16 designates a frame body provided with a balance means 17, on which there are provided through a hooked rod 18 a circular or approximately circular suspension rod 19 having an arm 19a, and also through a hooked rod 20 a semicircular suspension rod 21. The free end of this suspension rod 21 and the intermediate portion of said circular suspension rod 19 are connected with each other by means of ring 22. The main body I is suspended on this frame body 16 by connecting said suspension rod 19 to one end of the long ring 23 whose other end is connected to said hooks 15-1, 15-2, 15-3 and 15-4, and also by connecting said suspension rod 21 to one end of the short ring 24 whose other end is connected to the hooks 15-3 and 15-4. A connecting rod 41 is at its one end connected with said arm 19a extending from said suspension rod 19 and at its other end connected with the balance rod 25 of the balance means 17. What is denoted at 26 is the balance weight which is movable along with a balance rod 25 and is located in a predetermined position of the graduation marked on the balance rod 25.

While the present invention is constructed in the above-mentioned manner, its functions are as described in the following.

Firstly the balance weight 26 of the balance means 17 is located in any desired position of the balance rod 25, and then the fan motor 3 is driven to produce negative pressure in the inside of the main body I, so that the pulverized plastic elements are absorbed through the delivery pipe 2 into the separation room A of the main body I from the suction nozzle 7 which is inserted into the repository for storing these elements. Then said elements are cyclonically dispersed in this separation room A and subside into the lower part of the main body I to be preserved therein. The air absorbed by a fan 4 is filtrated through a filter 5 and discharged outwardly from an exhaustion pipe 6 after passing through the motor 3 and meandering along the sound-arresting plate mou..ted in the air suction room B. When the pulverized plastic elements have been absorbed up to a determined quantity, the free end of the balance rod 25 of the balance means 17 is lifted resisting against the gravity of the balance weight 26. In this case the operator has merely to bring the driving fan motor 3 to a halt, whereby the air pressure in the main body I turns to be raised and the damper 11 is forced open by the dead load itself of the elements, consequently discharging the latter.

When the discharge of the elements is completed, the damper 11 is moved to close the shoot gate 8 under the influence of the balance weight 12. Thus by driving the motor fan 3 again, the same process of absorption just as has been mentioned above is repeated.

Since this invention provides the system in which a single main body comprises in combination a cyclone separation tank of the pneumatic delivery means and the hopper of the balance means for weighing the pulverized plastic elements to a fixed quantity, it is made possible by applying to this method of the invention to fulfill the two fundamentally indispensable functions of both pneumatically delivering the elements and balancing the delivered elements to a fixed quantity through means of this single main body.

Accordingly, it is to be noted that the aforeproposed objectives of the present invention can be realized very effectively. According to the above-exemplified methods and embodiments of the invention, the fulfillment of said two imperative functions is made possible only when the operator brings the driving of the fan motor to a stop by eyeing the elements have been absorbed up to a determined quantity, and also when he can see to it that the discharge of the elements has been just completed. However, these functions can be automatically controlled as well, according to the following method of the present invention. Namely, as is shown in the FIGS. 1 and 2, these are made possible by providing a limit switch 28 in such a manner that when the free end of the balance rod 25 is lowered, the lower edge thereof gets into contact with said limit switch 28 and brings the same to a close whereby the fan motor 3 is switched off, and also by providing a limit switch 29 in such a manner that when the damper 11 is forced open, it gets into contact with said limit switch 29 and brings the same to a close whereby the fan motor 3 is driven again.

According to the aforesaid method, the pulverized plastic elements are absorbed into the main body I by the fan motor 3 driven through the closed circuit of the main switch not shown in the drawings. When the elements have been absorbed up to a determined quantity, the free end of the balance rod 25 is elevated and the limit switch 28 is opened to break off electrical relations with the circuit leading to the fan motor 3, whereby the latter is automatically brought to a stop. In this case, just as has been referred to, the air pressure in the main body I is raised and the elements force the damper 11 open, consequently being discharged therethrough. When the discharge of the elements is finished and the damper 11 is left open, the limit switch 29 resumes to drive the fan motor 3 so that the inside of the main body I is depressed into negative pressure to shut up the damper 11 again. By applying to the construction wherein the absorption and discharge of the pulverized plastic elements can be automatically controlled, it is made possible to supply a determined quantity of the elements automatically and continuously to a desirably located means such as a mixing machine or a plastic former from the storing tank in which the elements are preserved. Furthermore it will be noted that a more effective function of supplying the elements can be secured by improving the construction of the present invention in such a method as is explained in the succeeding.

Figure 5:
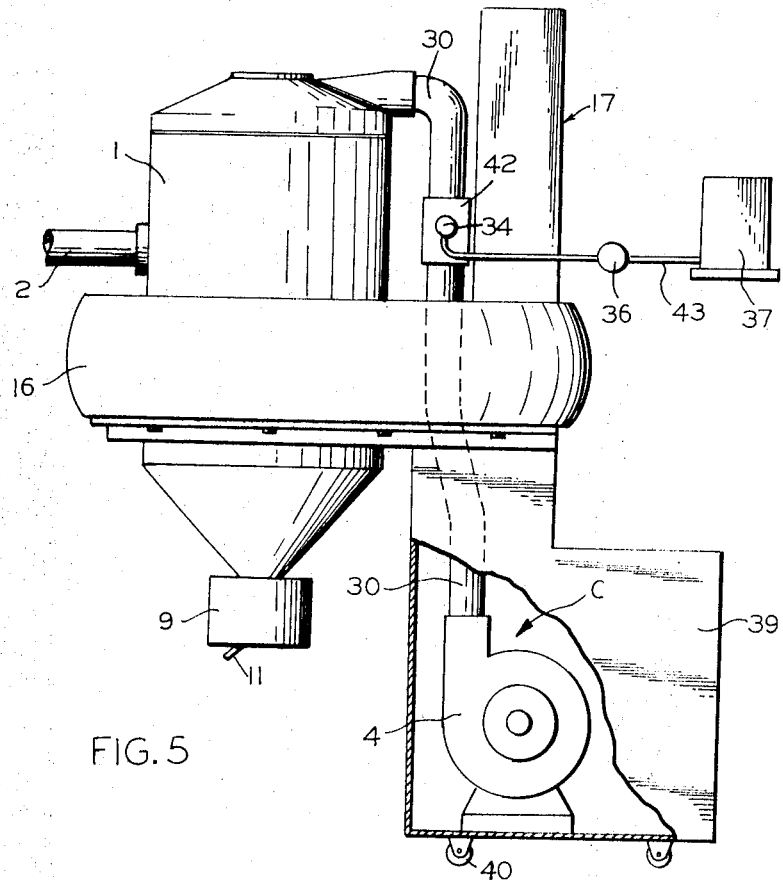
FIG. 5 is a schematic view illustrative of another embodiment of the invention.
Figure 6:
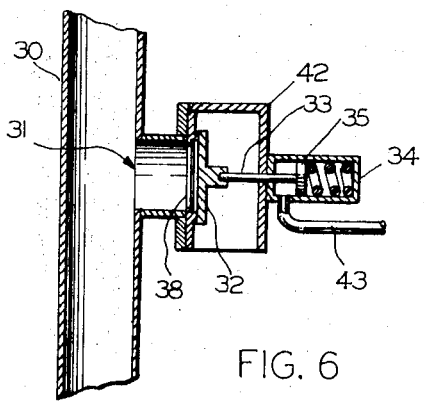
FIG. 6 is a vertical section view partially showing in enlargement of the principal element of the FIG. 5.

Referring to the FIGS. 5 and 6 as one of the examples, their differences in construction from the FIGS. 1 thru 4 are that the fan 4 is jointed to the main body I through a suction pipe 30, in the intermediate portion of which there is provided an opening 31 communicating to the outer atmosphere, and a valve 32 is provided for opening and closing this opening 31. Accordingly, when a desired quantity of the pulverized plastic elements has been absorbed up into the main body I, the valve 32 is moved to open the opening 31 to such a suitable extent as to permit the suction pipe 30 to communicate directly with the outer atmosphere and breathe the second air in through said opening 31 so that the absorption force produced by the fan 4 is weakened and the quantity of the elements to be further absorbed into the main body I is substantially reduced. Incidentally, by this desired quantity above-mentioned is meant that to which the elements come up a little before these will come up to a determined quantity.

Coming up to this desired quantity, the elements are absorbed excessively slightly and thus it is possible to weigh these absorbed elements exactly to a determined quantity. The movement of the valve 32 is carried out by the following arrangements. That is, the valve rod 33 of this valve 32 is jointed with the piston 35 of the air cylinder 34 which is connected with a compressor 37 through a valve switch 36 provided with a switch means (not shown) for operating the same. Said valve switch 36 is so wired as to be operated by a noncontact-point switch (not shown) provided on the balance means 17 in such a manner that said noncontact-point switch means works when the pulverized plastic elements have been absorbed up to a desired quantity in the main body I.

It is also possible to use the limit switches 28 and 29 jointly with said noncontact-point switch so that the fan motor 3 is automatically brought to a halt when the elements have been absorbed up to a determined quantity. In the drawings the box is illustrated at 42 whose unilateral side is opened for accommodating the valve 32 and an air pipe 43 is connected with an air cylinder 34.

By providing on said opening 31 shown in the FIG. 6 the regulator plate 38 for regulating this opening 31, the above-mentioned construction further makes it possible to regulate the quantity of the second air which is absorbed through the regulating function of said regulator plate 38, just when the valve 32 is opened, whereby the pulverized plastic elements are weighed to the most suitable quantity.

As is well shown in the FIG. 5, if the absorbing means C composed of the fan motor 3 and the fan 4 is, instead of being mounted immediately on the main body I, installed in a place separate of this main body I through the suction pipe 30, then the balance means will very exactly function without being subject to the vibration produced by the rotation of the absorbing means C. For this purpose, said absorbing means C is mounted on the base 39 supporting the balance means 17 and provided movably with the wheels 40. As has been mentioned hereunto, therefore, it is to be understood that the present invention makes it possible to pneumatically deliver the pulverized plastic elements and at the same time balance the same accurately to a determined quantity merely by applying to a single supplying system, and as a result thereof, the means for supplying the pulverized plastic elements can be constructed substantially in a small size and installed in a spatially narrow place to economize the extra cost of equipment.

What we claim is:

1. Apparatus for pneumatically picking up pulverized material from a storage location and feeding said material to another location, comprising
   A. pipe means having a flexible portion located toward one end thereof to enable movement of said pipe means, and a nozzle at the other end thereof for placement at said storage location;
   B. weighing hopper means having a top portion, an intermediate portion and a bottom portion, said intermediate portion having an opening therein to which said pipe means is attachable, and said bottom and top portions each having an opening therein;
   C. filter means located within said hopper means toward the top of said intermediate portion and covering said opening at said top portion;
   D. outlet means comprising a normally closed door means, attachable to said opening at said bottom portion;
   E. weighing means for determining the weight of said hopper means and material contained therein, said weighing means comprising a frame means, a beam and adjustable weights on said beam for determining the weight of said material, and means for supporting said frame means;
   F. vacuum means comprising a motor means and a pump means operable by said motor means, said pump means connectable to said opening at said top portion;
   G. means under the control of said weighing means for controlling said motor means to operate said pump means whereby said pulverized material is pneumatically pumped from said storage location through said pipe means and into said hopper means until a predetermined amount of said material as measured by said weighing means is contained within said hopper means, whereupon said pump means is caused to cease operation and substantially all of said material held within said hopper means is released through said outlet means by action of gravity upon said door means, said filter means preventing said material from entering said pump means during operation of said pump means; and H. means for returning said door means to a closed position and for again operating said motor means to operate said pump means thereby to repeat the above sequence.

2. Apparatus of claim 1, wherein said filter means comprises a filter and a chamber between said opening at said top portion and said filter.

3. Apparatus of claim 1, wherein said pump means is connected to said opening of said top portion by a connecting means, and further comprising an inlet port on said connecting means, valve means for opening and closing said inlet means, and means for opening and closing said valve means.

4. Apparatus of claim 3, wherein said valve means comprises a plate for controlling the opening of said inlet port, and wherein said means for opening comprises a rod, connected to said plate, a cylinder, a piston contained within said cylinder and attached to said rod, spring means for normally holding said plate against said inlet port opening, and compressed air means for controllably moving said piston against said spring means to cause said plate to open said inlet port opening.

5. Apparatus of claim 3, wherein said connecting means comprises a pipe means having a flexible portion, and means for preventing said pipe means from acting upon said hopper means.